Oct. 25, 1927.
H. Y. NORWOOD
1,646,977
THERMOMETER
Filed April 3, 1926
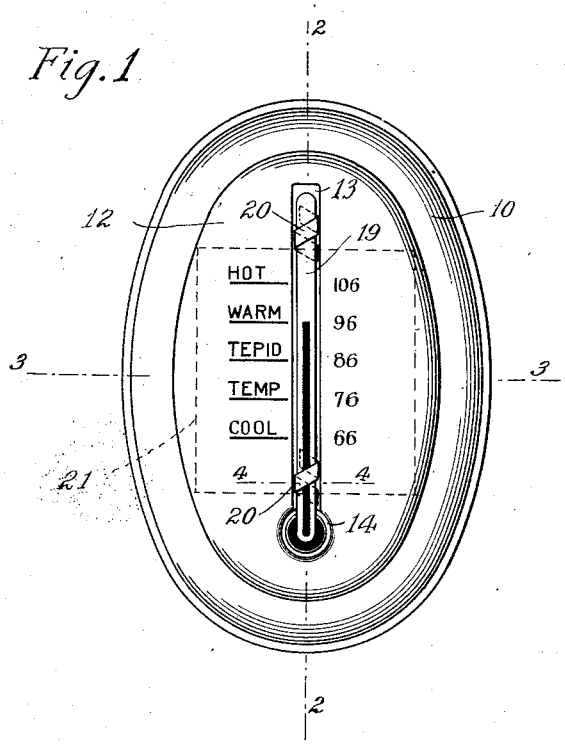
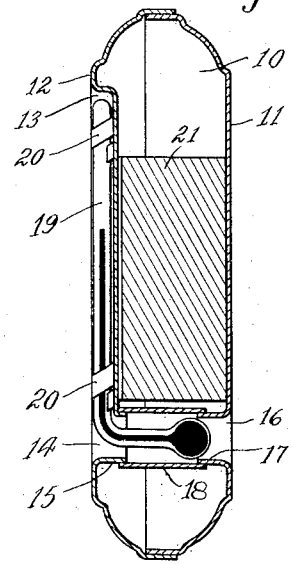
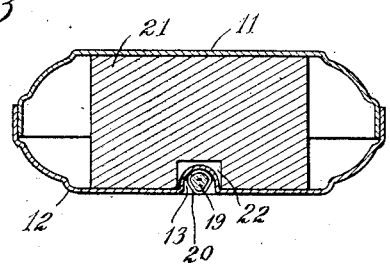
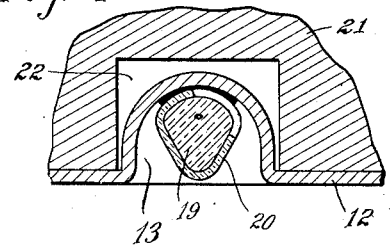
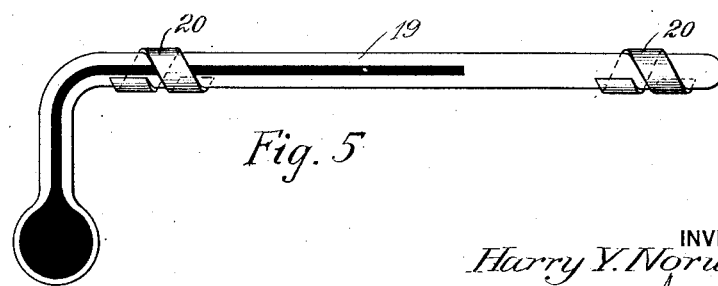
INVENTOR
Harry Y. Norwood
BY Alfred Burger
his ATTORNEY Patented Oct. 25, 1927.

1,646,977

UNITED STATES PATENT OFFICE.

HARRY Y. NORWOOD, OF AVON, NEW YORK, ASSIGNOR TO TAYLOR INSTRUMENT COMPANIES, OF ROCHESTER, NEW YORK, A CORPORATION OF NEW YORK.

THERMOMETER.

Application filed April 3, 1926. Serial No. 99,541.

This invention relates to thermometers and particularly to the attachment of the tubes to their support.

It is a more general object of the invention to provide a simple and cheap device for securing a thermometer tube to its base. Another and more specific object is a hollow base for a thermometer and novel means for securing a thermometer tube thereon.

Various other objects and advantages will be apparent from the following description of an embodiment of the invention, and the novel features will be particularly pointed out hereinafter in connection with the appended claims.

In the accompanying drawings:

Figure 1 is a plan of a bath thermometer constructed in accordance with the invention;

Figure 2 is a longitudinal sectional elevation of the same with the section taken approximately along the line 2—2 of Figure 1;

Figure 3 is a transverse sectional elevation through the same, with the section taken approximately along the line 3—3 of Figure 1;

Figure 4 is a sectional elevation through a portion of the thermometer and tube and float, on a somewhat larger scale, the section being taken approximately along the line 4—4 of Figure 1; and Figure 5 is an elevation of the thermometer tube and straps by which it may be secured to a base.

While my invention is not limited to any particular form of base for supporting the thermometer tube, a typical embodiment is represented by a floating thermometer comprising a hollow body of celluloid or other similar composition material.

In the illustrated embodiment of the invention a relatively flat float 10, may be formed by nesting together in opposed somewhat telescopic relation, two shallow cup shaped shell sections 11 and 12 of sheet material, so as to form a hollow casing. One of the shell sections such as 12, may have in a face thereof a depressed portion 13 in the form of a longitudinally extending groove or channel. The same shell section may have in its face an aperture 14 into which the groove 13 extends, the aperture 14 being defined by an inwardly extending tubular flange 15. The shell section 11 is also provided with an aligned aperture 16 which is also defined by an inwardly extending tubular flange 17, aligned with the flange 15. A sleeve 18 is disposed between the two shell sections, so as to receive closely the tubular flanges 15 and 17, and form with them a tubular passage extending through the float from one face to the other.

An L-shaped thermometer tube 19 is disposed with its reservoir arm in the passage formed by the flanges 15 and 17, and the sleeve 18, the arm extending nearly but not quite through the passage, and the other or indicating arm of the tube is disposed in the groove 13, against the face of the shell section 12, as was heretofore the practice in connection with floating thermometers of wood or other solid floating material. One of the essential parts of my invention is the provision of means for securing the thermometer tube to its base. I have found that strips 20 of non-metallic sheet material encompassing the thermometer tube and adhesively connected to the base afford a simple and effective means for securing the tube to the base. When the base is of celluloid, strips of celluloid may be advantageously used since it is a simple and well known matter of expedience to form a firm union between the strips 20 and the base. The strips 20 are preferably spirally wound about the tube, and are or may be in contact with the wall of the groove 13 substantially along the peripheral or transverse extent thereof, whereby a firm and secure union may be effected. Strips of celluloid or other transparent material have the advantage that they do not interfere with the reading of the thermometer. However, I prefer to place the strips at or near the ends of the tube outside the usual reading range. This mode of securing the tube to the base is a practical equivalent of the usual strap and screw mounting in connection with a solid base of wood or the like. With a hollow base of sheet material it is desirable to prevent flexing of the shell sections or collapse thereof, particularly in a manner that might result in injury to the thermometer tube such as by causing the reservoir end to project through the float and beyond a face thereof where it would be exposed to possible blows or injury. Accordingly, I may place within the shell a suitable form which extends between the faces of the shell and stiffening them against collapse affords a durable and permanent support for the tube 19. Such a form may comprise for example, a spacer block 21 of wood or other suitable material, which fits between the faces of the float so as to prevent relative flexing movement thereof and eventually a complete collapse, and such block will be provided in one face with a groove 22, which receives the inwardly depressed section of the shell that defines the groove 13. The face of the shell 12 against which the thermometer tube is placed may carry suitable reference terms or figures along the tube, as is general practice.

It will be obvious that various changes in the details, which have been herein described and illustrated in order to explain the nature of the invention, may be made by those skilled in the art within the principle and scope of the invention as expresed in the appended claims.

What I claim is:—

1. The combination of a thermometer tube, a base of sheet material of a thickness considerably smaller than the width of the tube, the base being shaped to define a groove receiving the tube, and a narrow strip of thin sheet material adhesively connected to the base and connected with the tube to hold it in place in the groove.

2. The combination of a thermometer tube, a base of sheet material of a thickness considerably smaller than the width of the tube, the base being shaped to define a groove receiving the tube, and a narrow strip of thin sheet material encompassing the tube and adhesively connected to the wall of the groove.

3. The combination of a thermometer tube, a base of sheet material of a thickness considerably smaller than the width of the tube, the base being shaped to define a groove receiving the tube, and a strip of flexible transparent material encompassing the tube and adhesively connected to the wall of the groove.

4. The combination of a thermometer tube, a base of sheet celluolid shaped to define a groove receiving the tube and a narrow strip of sheet celluloid encompassing the tube and adhesively connected to the base.

5. The combination of a thermometer tube, a substantially hermetically closed hollow body having a wall of a substantially uniform thickness materially less than the width of the tube, said wall being shaped to present in one face a groove receiving the tube and a narrow strip of sheet material adhesively connected to the surface of the groove and bearing upon the tube to hold it in place.

6. The combination with a thermometer tube and a base having a depression receiving the tube, of a strip of non-metallic sheet material adhesively connected to the base and bearing upon the tube to hold it in place in the depression.

7. The combination with a thermometer tube and a base having a depression receiving the tube, of a strip of non-metallic sheet material encompassing the tube and adhesively connected to the wall of the depression.

8. The combination with a thermometer tube and a base having a depression receiving the tube, of a strip of transparent sheet material adhesively connected to the base and bearing upon the tube to hold it in place in the depression.

9. The combination with a thermometer tube and a base of non-metallic sheet material defining a depression receiving the tube, of a strip of transparent sheet material encompassing the tube and adhesively connected to the base.

10. The combination with a thermometer tube and a base of sheet material of the order of celluloid, of a strip of material of the order of celluloid encompassing the tube and adhesively connected to the base.

11. The combination with a thermometer tube and a base of sheet material of the order of celluloid, having a depression receiving the tube, of a strip of transparent material of the order of celluloid, encompassing the tube and adhesively connected to the base.

12. The combination with a thermometer tube and a base of sheet material of the order of celluloid, having a depression receiving the tube, of a strip of transparent material of the order of celluloid surrounding the tube and adhesively connected to the wall of the depression.

13. The combination with a base of sheet celluloid, a thermometer tube disposed against a face of such shell, a celluloid strap wound spirally around said tube for spacing the tube slightly from the shell and cemented to the shell for anchoring the tube thereto.

14. The combination of a hollow base of sheet material having a depression in one face, a thermometer tube in the depression and a spacer block within the base for minimizing flexing movement of the walls thereof.

15. A floating thermometer comprising a floating shell of sheet material having a depression in a face thereof, a thermometer tube secured in said depression, and reinforcing element in said shell engaging with the shell along the face having the depression, so as to prevent collapse of the shell with possible injury to the tube.

16. A floating therometer of sheet material including a hollow float, a stiffening form within said float and extending between the faces thereof to stiffen the same against collapse, one face of such float having a depression therein, and a thermometer tube mounted in said depression.

17. A floating thermometer comprising a hollow shell of sheet material, a block in said shell extending between its faces to prevent collapse of the shell from face to face, said block having a groove in one face, said shell having a groove extending into said block groove, and a thermometer tube secured in said groove of the shell.

In testimony whereof I affix my signature.

HARRY Y. NORWOOD.